Aug. 15, 1961 P. C. SALTERBACH 2,996,189
FILTER SCREEN INSTALLATION
Filed Oct. 22, 1959 3 Sheets-Sheet 2

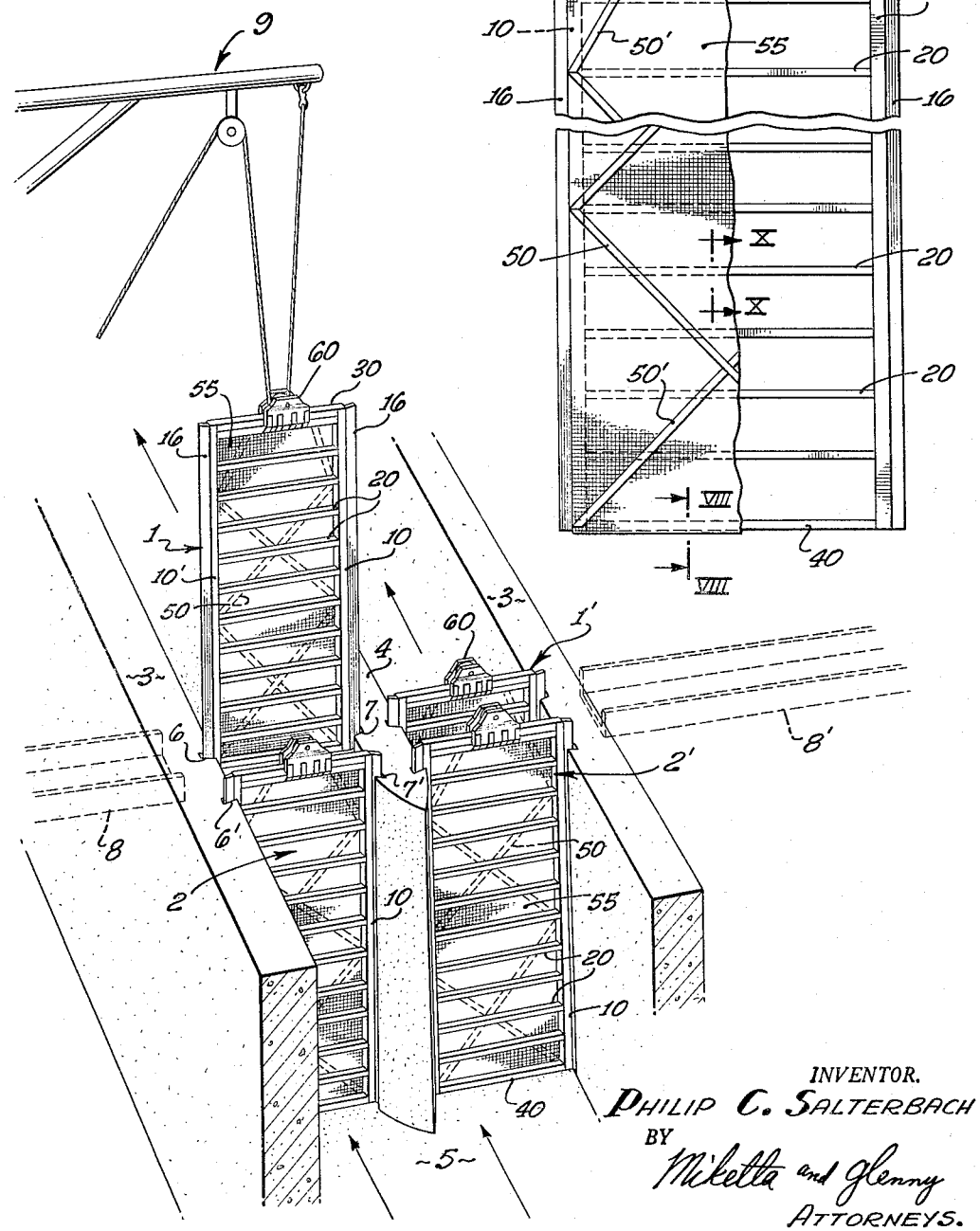

INVENTOR.
PHILIP C. SALTERBACH
BY Miketta and Glenny
ATTORNEYS.

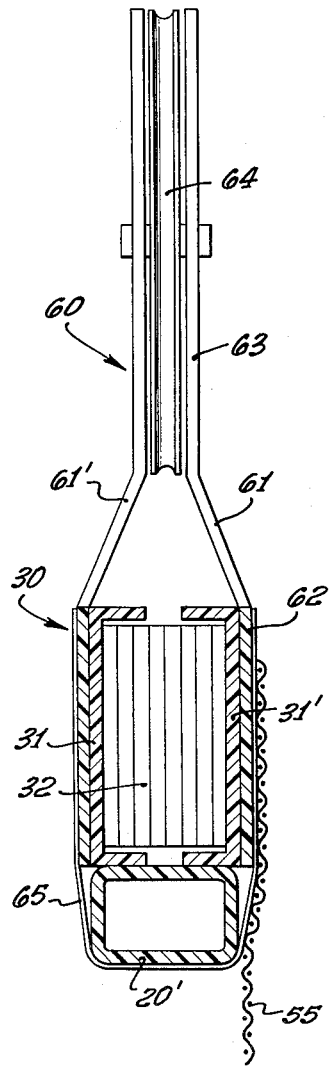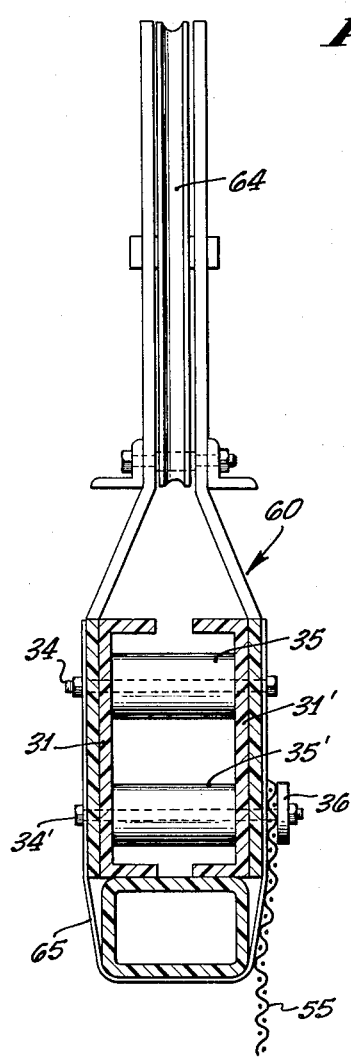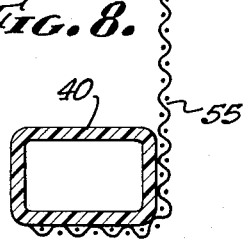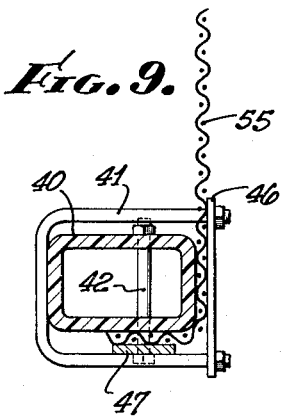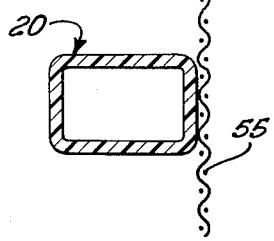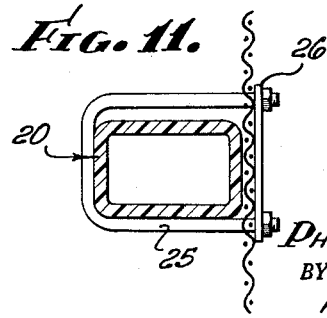

United States Patent Office 2,996,189
Patented Aug. 15, 1961

2,996,189
FILTER SCREEN INSTALLATION
Philip C. Salterbach, Los Angeles, Calif., assignor to X-Port Oils, Inc., Los Angeles, Calif., a corporation of California
Filed Oct. 22, 1959, Ser. No. 848,122
3 Claims. (Cl. 210—155)

This invention pertains to a high capacity, corrosion-resistant filter screen installation adapted to remove foreign solids from large volumes of water. The invention is particularly directed to a filter screen installation which may be continuously operated and which has an extremely long life.

Many power plants generating electricity are located along waterways or along the seashore in order to have available the tremendous quantities of water required either as boiler feed water or as cooling water. Such plants as are located on bays, inlets or adjacent the seashore utilize the salt or brackish water only as a coolant. A typical plant of this type may employ between 140,000 and 160,000 gallons of water per minute simply for the purpose of absorbing excess heat from the generators.

These tremendous quantities of water must be free from extraneous solids, such as fish, branches, lumber, dead bodies and other foreign objects. During and after storms or heavy rains, tremendous quantities of various foreign objects are carried by the waters. Screening devices have been employed in the past for the purpose of removing such debris from the waters before they are used, but it is also necessary to periodically clean the screens. Endless conveyor types of moving screen have been used but such installations are extremely expensive and have a very short effective life due to the corrosion of the metal parts from which they are constructed. Moreover, it is to be remembered that the health and welfare of the public depend upon the continuous operation of power-generating plants and therefore it is not feasible to discontinue the operation of the screens as long as the plant is producing electric power.

The present invention is directed to a high capacity filter screen installation which is corrosion resistant and has an extremely long life in comparison with prior devices for the purposes stated. Moreover, the invention is directed to an arrangement of elements whereby the screens may be rapidly and effectively cleaned without discontinuing the screening of waters being supplied to the plant. Furthermore, a filter screen installation constructed in accordance with the present invention not only can be installed for approximately one-half the cost of a continuous, moving screen strainer but has a life of at least four or five times as long as the previous screens.

Generally stated, the invention contemplates an installation wherein incoming waters pass through two screens in succession, each of the screens being independently movable vertically to a position above water level, in which position the screen may be readily flushed and the debris removed therefrom by water jets. During such arrangement, incoming waters are always screened through at least one screen and therefore removal of debris is not interrupted at any time.

The present invention also contemplates rectangular screen assemblies which are all plastic structures having hollow, reinforced, plastic structural members bonded together by epoxy-type resins and filled or potted in various areas with plastic resins; a plastic fabric screen and a plastic sheave and shaft. The absence of any metal parts in the screen assembly prevents galvanic action, electrolysis and corrosion.

The present invention also contemplates as an alternate rectangular screen assemblies which are made of only two materials, i.e. reinforced plastic and a single metal from which the fabric and necessary bolts and connectors are made. This arrangement greatly reduces galvanic action, electrolysis and corrosion.

In order to facilitate understanding and more completely disclose the construction and materials employed, reference will be had to the following description and appended drawings, in which:

FIG. 1 is a perspective, somewhat schematic representation of a typical filter screen installation at the intake to a pen stock from which water is drawn into an electric power-generating plant;

FIG. 2 is an enlarged, downstream elevation of a typical screen assembly;

FIG. 6 is an enlarged vertical section along the plane VI—VI in FIG. 2;

FIG. 7 is a vertical section along a plane located similarly to that in FIG. 6, but illustrating a modified construction;

FIG. 8 is a vertical section through a bottom member along the plane VIII—VIII in FIG. 2;

FIG. 9 is a vertical section through a bottom member illustrating a modified construction;

FIG. 10 is a section along plane X—X in FIG. 2; and

FIG. 11 is a section showing a modified construction.

Figure 3:
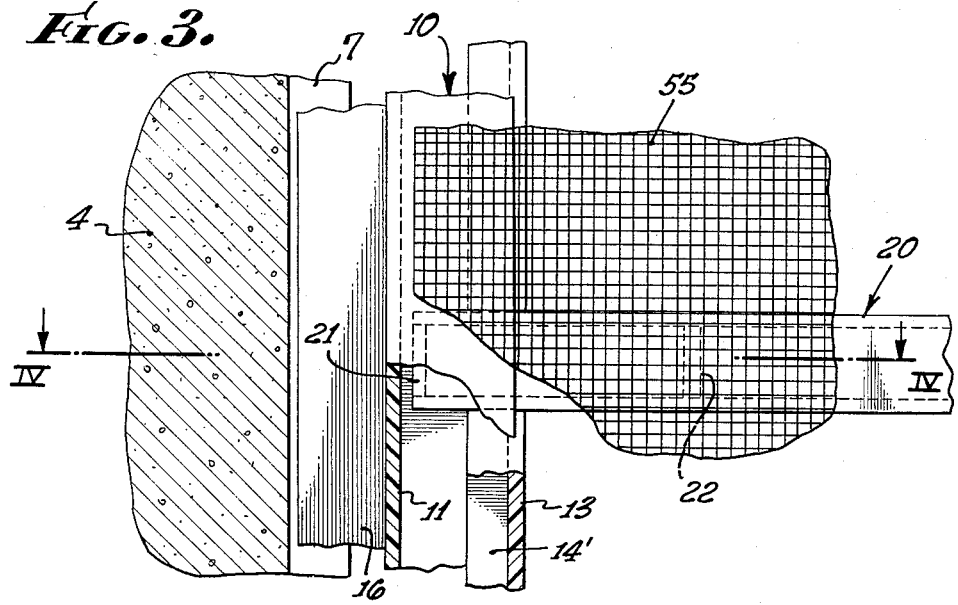
FIG. 3 is an enlarged portion in elevation of the screen assembly of FIG. 2, portions being broken away and showing the intersection of a vertical edge member and a horizontal bar member and the relationship of the assembly to an intake wall.

Because of the corrosive effect of salt water upon metal parts as well as its tendency to induce galvanic action and electrolysis, the preferred embodiment, as shown in FIGS. 1 through 8, is preferably made entirely of plastic material, including the structural members, the screen fabric and the sheave means, including the shaft upon which the sheave turns. This construction is completely resistive to the above-noted destructive process. The necessary connections and fastenings between the structural members and between the plastic screen fabric and the structural members are accomplished by the use of an epoxy-type resin as a bonding material which affords a very strong union between the plastic elements of the assembly. The various preformed channels, hollow rectangular headers and other structural members of the assembly are preferably made by arranging rovings and yarn of glass fiber (impregnated with a binding resin) in parallel, side-by-side relation, subjecting each glass fiber to tension, embedding the same in a covering resin and curing the object. The method disclosed in the copending application filed by Elvin M. Bright, Serial No. 619,351, is well adapted to the manufacture of such members. Various resins and resin compositions may be employed, such as polyester types, phenolic base resins, epoxy resins, polystyrene and polymers, copolymers and mixtures thereof. Condensation products of dicarboxylic acids with glycols (the reaction product of phthalic and maleic anhydride with ethylene glycol is an example) and polyether derivatives of polyhydric organic compounds (such as the epoxy-type resins obtainable by reaction of bis phenol A or polyhydric alcohols with epichlorohydrin) are exemplary of suitable resins which can be cured at relatively low temperatures of 150° F. to 220° F.

It may be noted that all these resinous objects and parts of the screen assembly ordinarily contain 60% to 70% of glass fiber or other siliceous or inert reinforcing and 30% to 40% of resin. Extremely high flexure strength and resistance to salt and brackish waters are therefore obtained.

As shown in FIG. 1, the filter screen installation comprises a pair of filter screen assemblies 1 and 2 positioned between two substantially vertical and parallel concrete walls 3 and 4 which are connected at the bottom by a generally flat concrete floor 5. One or more additional filter screen installations comprising filter screen assemblies 1' and 2', as shown in FIG. 1, may also be employed to provide greater filtering capacity for large installations. The concrete walls 3 and 4 contain a pair of parallel, opposing, vertical guide channels 6 and 7 in which each of the screen assemblies, such as 1, can slide vertically to allow their being raised for a cleaning operation. The concrete walls 3 and 4, with the floor 5, form a raceway through which unfiltered water can be brought to the screen assemblies 1 and 2. The salt or brackish water then passes through the screen assemblies 1 and 2 and is accordingly filtered of any debris.

To facilitate the cleaning of the screen assemblies 1 and 2, either screen assembly can be independently raised vertically by the use of a suitably equipped boom 9 or other available hoist mechanism and then be flushed by a water jet disposing of the collected debris by way of a disposal trough 8 or 8'. Since there are at least two screen assemblies in any installation, the filtering process can be continued while one of the screen assemblies is raised and cleaned, since the other may remain in operation during the cleaning process.

Each screen assembly such as 1, whose down-stream elevation is shown in FIG. 2, comprises a pair of longitudinal edge members 10 and 10', a plurality of parallel, spaced, horizontal members 20 interconnecting the longitudinal edge members, a top horizontal member 30, a bottom horizontal member 40, struts or diagonal braces 50, a filter screen 55 and a sheave-carrying means 60. In the preferred form of this invention, all of the members, struts, etc. are made of resinous, rigid, reinforced compositions.

Figure 4:
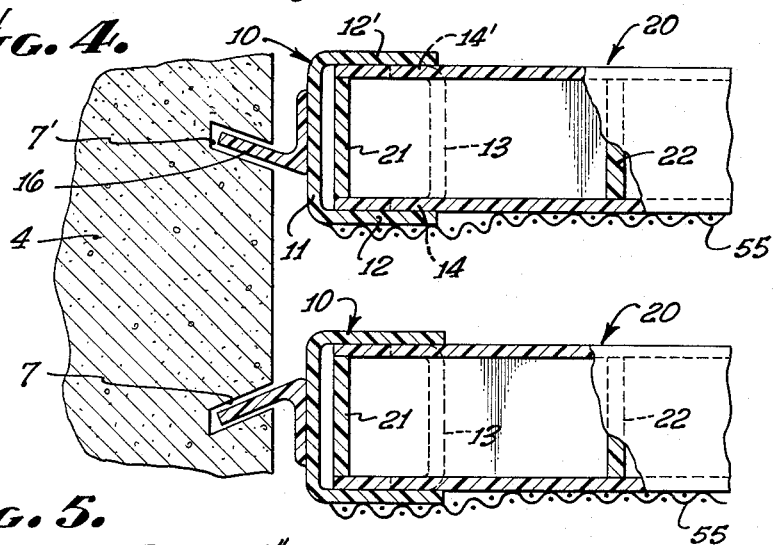
FIG. 4 is a transverse horizontal section, taken along the plane IV—IV in FIG. 3 and also shows schematically the relative position of a companion screen assembly.

Enlarged views FIGS. 3 and 4 exemplify the construction used at an intersection of a vertical edge member 10 and a horizontal rail member 20. The edge member 10 is shown as being composed of an outer, continuous channel (made of preformed, cured resin preferably reinforced with parallel, longitudinally extending, tensioned fiber glass), such channel having the outer web 11 and unperforated flanges 12 and 12'. Extending into the channel is the end of a rail member 20 having a hollow rectangular section (best shown in FIG. 10). Transverse partitions in spaced relation, such as 21 and 22, also of resinous composition, may be cemented within and to the rail member 20, one of such partitions being at or near the end of rail 20. The outer end portions of rail 20 are bonded to the inner surfaces of flanges 12—12' of the channel. Rail 20 is spaced from adjacent similar rails (and from the upper and lower headers 30 and 40) by short channel members 13 having flanges 14 and 14', these flanges extending between and being also cemented or bonded to the inner surfaces of flanges 12 and 12'. End faces of these short channel members 13 abut and are bonded to rails 20, maintaining the rails in properly spaced, parallel relation. The longitudinal edge member 10 is therefore of box section and of great rigidity and strength. Spaces between partitions 21 and 22 at the end portion of the rails may be filled with a cold-setting reinforced or silica-filled resin composition to impart even greater strength. A similar potting composition may be used to fill the space within the longitudinal edge member and adjoining the end of a horizontal member to firmly anchor the same.

The outer surface of web 11 of the vertical edge member is preferably provided with means adapted to cooperatively enter and contact the adjacent vertical guiding channel formed in the wall of the intake channel and thereby maintain the screen assembly in position during filtering or screening and permit vertical movement of the screen assembly into raised, flushing position. A simple and effective retaining and guide means comprises an L-shaped member 16 cemented or bonded to the outer surface of web 11 by means of a suitable resinous adhesive (such as a phenolic or epoxy), one wing of such member 16 being adapted to extend into guide channel 7'.

The top horizontal member 30 is preferably of larger cross section than the rails 20 and may be a separate member or combined with a rail member as in the form illustrated in FIG. 6. As there shown, the top member 30 comprises two channel shapes 31 and 31' with flanges extending toward each other, these two channels embracing and containing a plurality of resinous panels 32 in side-by-side relation, the entire assembly being bonded together to form a solid beam. End portions of the panels 32 and channels 31—31' extend into and are cemented to the inner surfaces of the end portions of the vertical edge members 10 and 10'. The beam or top member 30 may rest upon and be bonded to a top rail 20' as illustrated.

In order to provide means for raising and lowering the screen assembly one or more sheave-carrying means are provided on each top beam. The single means 60 illustrated comprises two, preformed, resin-composition hanger plates 61 and 61', each having a lower, enlarged, substantially rectangular, planar, lower portion 62 adapted to be bonded to the outer surface of a beam channel 31 and an integral, upper portion 63 of substantially triangular form having a section lying in an offset plane. This places the upper portions 63 of the hanger plates in relatively close, parallel relation. Mounted upon an axle extending through aligned bores in such upper portions 63 is a sheave 64. The use of a polyamid or teflon for the axle is recommended because of the low friction coefficient. U-shaped straps 65 may have their arms bonded to the outer surfaces of lower portions 62 of the hanger plates and embrace a top rail, as illustrated.

The bottom, horizontal member 40 (FIG. 8) need not be as heavy as the top beam 30. The bottom member 40 may be a hollow, unperforated element similar to a rail 20 and be bonded to the vertical edge members in the same manner as a rail. The entire interior of the bottom member may be filled with a self-curing, cold-setting composition.

The screen fabric 55 (generally with openings of from about ¼ in. to ½ in. square) is also made from a resinous composition and is carried on the downstream side of the screen assembly. Debris collecting on such screen is therefore supported, in part, by the various rails when the screen is lifted for a flushing step. All edge areas of such screen fabric 55 are filled with a resinous adhesive and pressed and bonded to the external surfaces of vertical edge members (FIGS. 3 and 4) to the top and bottom members (FIGS. 6 and 8) and to the intervening horizontal rails 20 (FIG. 10). Clamping strips are not required. However, it is desirable to strengthen the assembly and at the same time increase the bursting strength of the screen by placing diagonal struts or braces 50, 50' and the like over the outer, downstream surface of the screen (FIGS. 1 and 2). These braces may be planar strips, angles, T-bars, or channels and are cemented or bonded through the screen fabric to underlying structural members such as rails and edge members. An exemplary arrangement of such braces is illustrated and can be varied.

In the above embodiment (details being shown in FIGS. 2, 3, 4, 6, 8 and 10), the entire screen assembly is made of non-metallic, resinous, reinforced plastic compositions and produces a light-weight, rigid assembly having exceptionally great resistance to salt and brackish waters, corrosion, etc. An alternative construction is shown in FIGS. 5, 7, 9 and 11 in which the preformed, plastic channels, hollow rails, etc. are used in combination with metallic elements, all of the metallic elements being preferably of substantially the same metal or alloy to inhibit corrosion and galvanic action as much as possible. Monel metal, stainless steel or a copper-silica bronze, such as Everdur (American Brass Co.) have been used.

Figure 5:
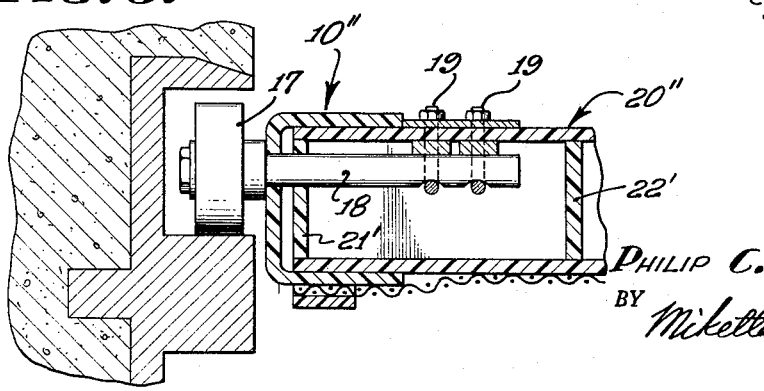
FIG. 5 is a horizontal section taken along a plane located similarly to that in FIG. 4, but illustrating a modified construction.

FIG. 5 exemplifies such alternate construction. The vertical edge member 10″ is of interengaging, preformed, reinforced, plastic channels (as in FIG. 4) and receives a preformed plastic rail 20″. The guide means comprises a plurality of spaced, plastic composition rollers 17, each rotatably mounted upon a pin 18 extending outwardly (through ports formed in the plastic members) from the end portion of rail 20″. Pin 18 is held by U-bolts 19 passing through a wall of rail 20″. The pin, bolts and nuts are of metal. The space between transverse partitions 21′ and 22′ is preferably potted or filled with a resinous, water-resistant composition of the cold-curing type, provided with suitable curing and accelerating components and an inert reinforcing such as glass fibers, asbestos or silica, so as to set and cure at, say 20° C. to 40° C. All internal spaces traversed by metal parts are similarly potted.

Attention is drawn to the fact that the shape of the guide channel in the wall of the intake is modified to accommodate the roller (over that formed to receive a guide fin). FIG. 5 also illustrates the use of a clamping strip over the edge area of a screen; such clamping strip may be of plastic composition, bonded through the screen openings by a resinous adhesive.

In FIG. 7 the channels 31 and 31′ of plastic composition are connected by bolts 34 and 34′ extending through bored resin composition spacers 35 and 35′. Certain bolts, such as 34′, may also hold clamping strips 36 against the screen 55 (which may be of metal or plastic). The sheave-carrying means and sheave may be of either metal or plastic. The space between channels 31 and 31′ and around the spacers 35 and 35′ may be potted.

As shown in FIGS. 9 and 11, the screen fabric may be held to the bottom rail and intermediate rails by V-bolts and clamping strips (such as 41 and 46 in FIG. 9 and 25 and 26 in FIG. 11). FIG. 9 shows an additional bolt 42 extending through bottom member 40 and holding screen fabric 55 by a clamping strip 47. It is to be noted that the bolts pass through the fabric; bottom rail 40 should be filled with a potting compound.

It is to be understood that although two alternate constructions have been described, and the all-plastic construction is preferred, circumstances may arise wherein a part only of the alternate construction is used with the preferred construction. All modifications coming within the scope of the appended claims are embraced thereby.

I claim:

1. A high capacity, corrosion-resistant, filter screen installation for the treatment of salt and brackish water in a water intake channel, comprising: a rectangular screen assembly adapted for vertical movement between a pair of vertical guide channels disposed in opposing walls of said water intake channel, said screen assembly including hollow, longitudinal edge members and a plurality of hollow, spaced horizontal members, said members being composed of resin composition reinforced with glass fibers and bonded together by a resin composition, wherein each longitudinal edge member comprises a continuous outer channel having inwardly directed flanges and a plurality of short channel spacer sections intermittently disposed along said channel, and wherein each of said horizontal members has end portions received in said channels between said flanges and is bonded to said flanges, said short channel spacer sections spacing said adjacent horizontal members and lying between said flanges of said outer channels, said spacer sections being bonded to said flanges and adjacent horizontal members; and screen fabric of resin composition carried by said screen assembly, areas of said screen fabric adjacent said longitudinal edge and horizontal members being filled with resin composition to bond said screen to said longitudinal edge and horizontal members.

2. A filter screen installation as in claim 1 wherein each of said end portions of said hollow horizontal members is provided with a transverse partition to form a chamber in said end portions between said partitions and said longitudinal edge members, and wherein guide means are provided on said screen assembly at said end portions of said horizontal members to extend laterally beyond the longitudinal members to guidingly engage said vertical guide channels, said guide means comprising a plurality of rollers, each rotatably mounted upon an axle member extending into and held within said end portion chambers, said chambers being filled with a resinous, water-resistant composition.

3. A high capacity, corrosion-resistant filter screen installation for the treatment of salt and brackish water in a water intake channel having a section provided with substantially vertically opposing walls and a flat bottom, comprising: a rectangular screen assembly adapted for vertical movement between a pair of parallel opposing, vertical guide channels disposed in opposing walls of a water intake channel, said screen assembly comprising hollow, longitudinal edge members, a plurality of hollow spaced horizontal members, each of said longitudinal edge members comprising a continuous outer channel having inwardly directed flanges and each of said horizontal members having end portions received in said edge members between said flanges, and short spacer sections disposed in said channels extending between adjacent horizontal members; and a metal screen fabric carried by said screen assembly having areas thereof adjacent said longitudinal edge and horizontal members filled with resin composition, and held to said assembly by resinous clamp strips, said fabric, strips and screen assembly members being held together by metal bolts and yokes wherein all metal parts of said screen assembly are composed of the same metal.

References Cited in the file of this patent

UNITED STATES PATENTS

| | | |
|---|---|---|
| 1,510,058 | Heller | Sept. 30, 1924 |
| 2,297,729 | Thomas | Oct. 6, 1942 |
| 2,468,249 | Wadleigh | Apr. 26, 1949 |
| 2,540,362 | Winslow et al. | Feb. 6, 1951 |
| 2,758,342 | Squires | Aug. 14, 1956 |
| 2,862,650 | Scott et al. | Dec. 2, 1958 |

FOREIGN PATENTS

| | | |
|---|---|---|
| 30,008 | Switzerland | Sept. 12, 1903 |